United States Patent
Jung et al.

(10) Patent No.: US 9,088,771 B2
(45) Date of Patent: Jul. 21, 2015

(54) MOBILE TERMINAL AND OPERATION CONTROL METHOD THEREOF

(75) Inventors: Hayang Jung, Seoul (KR); Seungmin Seen, Seoul (KR); Shinhae Lee, Seoul (KR); Jinsool Lee, Seoul (KR); Dongok Kim, Seoul (KR); Taeyun Kim, Seoul (KR); Seunghyun Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 519 days.

(21) Appl. No.: 13/224,629

(22) Filed: Sep. 2, 2011

(65) Prior Publication Data
US 2012/0133645 A1    May 31, 2012

(30) Foreign Application Priority Data

Nov. 26, 2010 (KR) .......................... 10-2010-0118918

(51) Int. Cl.
*G06T 7/00* (2006.01)
*H04N 13/00* (2006.01)

(52) U.S. Cl.
CPC ....... *H04N 13/0011* (2013.01); *H04N 13/0022* (2013.01); *G06T 7/0075* (2013.01)

(58) Field of Classification Search
CPC ....... G06T 19/00; G06T 15/20; G06T 7/0075; G09G 5/363; G09G 2340/0407; G06F 3/0488; G02B 27/2274; H04N 13/0055; H04N 13/0497; H04N 13/0239
USPC .......... 345/419, 519, 173, 427, 660; 382/154; 348/43, 51, 46, 42, 54; 715/804, 782
See application file for complete search history.

(56) References Cited

U.S. PATENT DOCUMENTS

| | | | |
|---|---|---|---|
| 7,371,163 B1 | 5/2008 | Best | |
| 2007/0165037 A1* | 7/2007 | Ryu et al. | 345/519 |
| 2010/0086199 A1* | 4/2010 | Kim et al. | 348/51 |
| 2010/0201789 A1 | 8/2010 | Yahagi | |
| 2011/0157046 A1* | 6/2011 | Lee et al. | 345/173 |
| 2011/0255775 A1* | 10/2011 | McNamer et al. | 382/154 |
| 2012/0127273 A1* | 5/2012 | Zhang et al. | 348/46 |

(Continued)

FOREIGN PATENT DOCUMENTS

| | | |
|---|---|---|
| CN | 1774937 | 5/2006 |
| EP | 1 617 684 A1 | 1/2006 |

(Continued)

OTHER PUBLICATIONS

European Search Report dated Feb. 22, 2013.
Japanese Office Action dated Apr. 16, 2013.
European Search Report dated Nov. 27, 2012.

*Primary Examiner* — Chante Harrison
(74) *Attorney, Agent, or Firm* — KED & Associates, LLP

(57) ABSTRACT

A mobile terminal as disclosed and broadly embodied herein may include a 3D display configured to display an object that includes a first and second images and a controller configured to change a magnification of the object that includes a first scaled image and a second scaled image and to correct a binocular disparity between the first and second scaled images. The controller may be configured to determine a binocular disparity between the first and second scaled images, determine whether the binocular disparity is within a prescribed range of disparity, reposition at least one of the first or second magnified images based on the determined binocular disparity, and control the display to display the corrected first and second scaled images.

18 Claims, 15 Drawing Sheets

(56) References Cited

U.S. PATENT DOCUMENTS

| | | | | |
|---|---|---|---|---|
| 2012/0262446 | A1* | 10/2012 | Im et al. | 345/419 |
| 2013/0009949 | A1* | 1/2013 | Hewes et al. | 345/419 |
| 2013/0010062 | A1* | 1/2013 | Redmann | 348/43 |
| 2013/0162641 | A1* | 6/2013 | Zhang et al. | 345/419 |
| 2013/0167081 | A1* | 6/2013 | Park | 715/804 |
| 2013/0249904 | A1* | 9/2013 | Kobayashi et al. | 345/419 |
| 2013/0268882 | A1* | 10/2013 | Roh et al. | 715/782 |
| 2013/0279797 | A9* | 10/2013 | Chauvier et al. | 382/154 |
| 2014/0043335 | A1* | 2/2014 | Kobayashi et al. | 345/427 |

FOREIGN PATENT DOCUMENTS

| | | |
|---|---|---|
| EP | 2 395 760 A2 | 12/2011 |
| JP | 2004-349736 A | 12/2004 |
| JP | 2009-246625 A | 10/2009 |
| JP | 2010-122856 A | 6/2010 |
| WO | WO 02/071764 A1 | 9/2002 |
| WO | WO 2007/057497 A1 | 5/2007 |

* cited by examiner

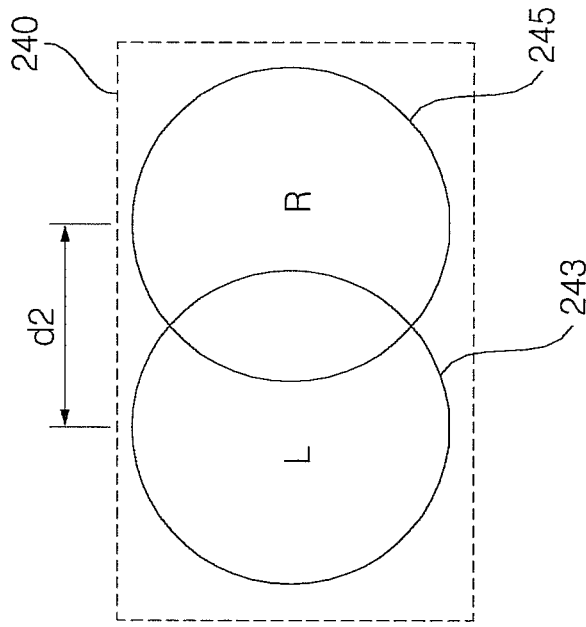
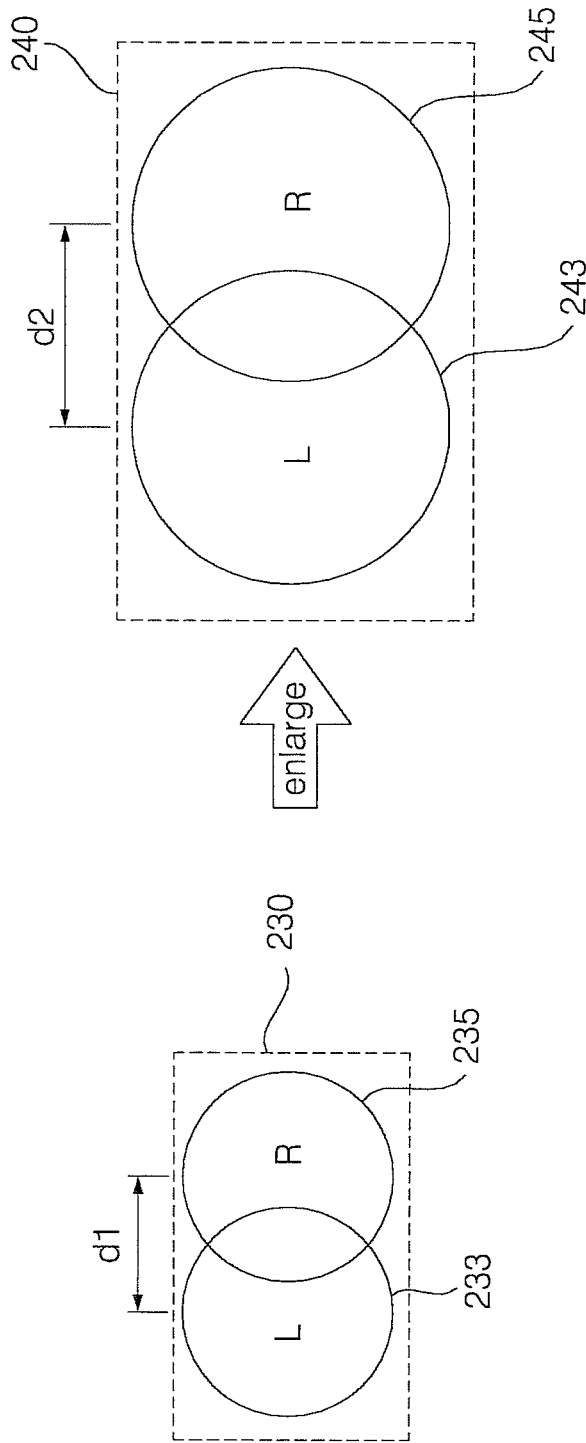

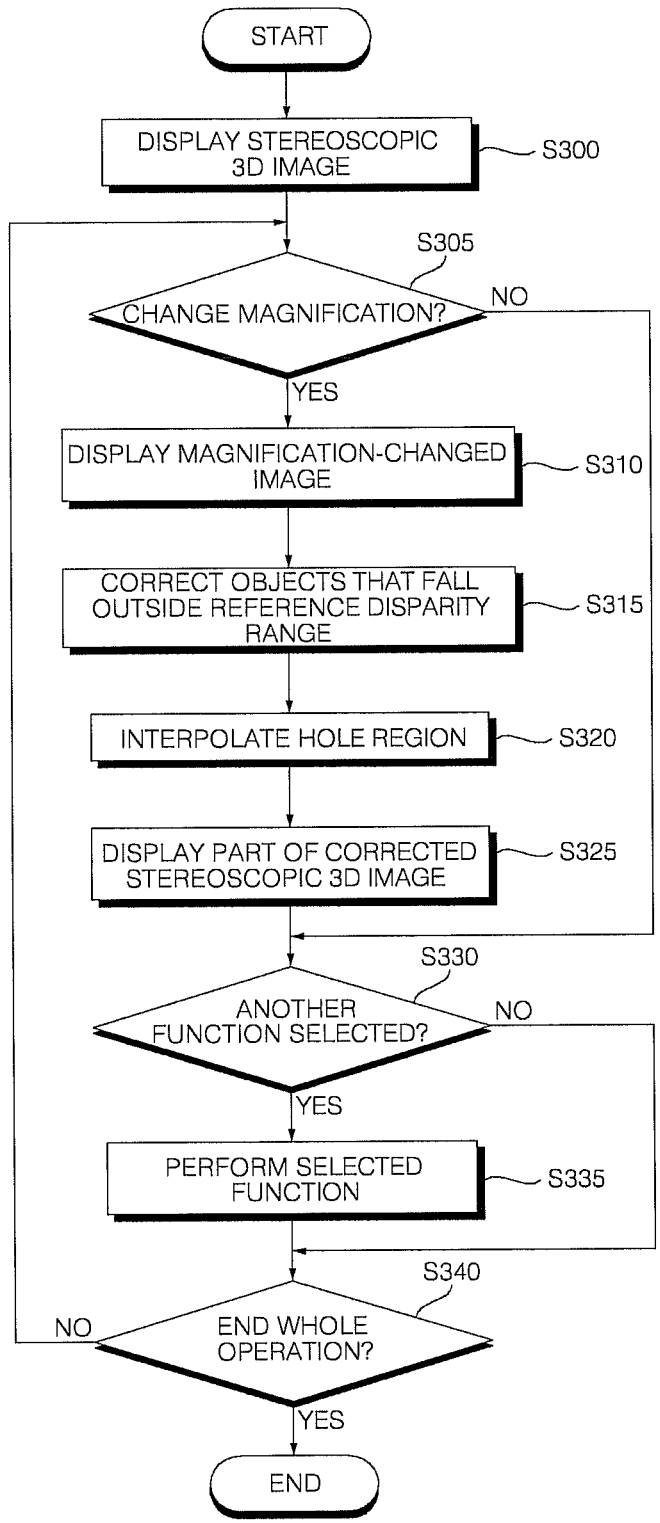

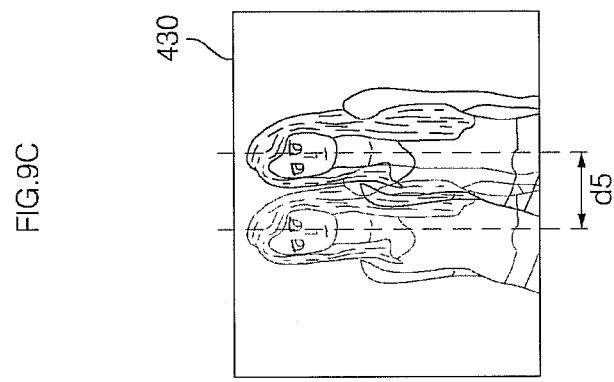
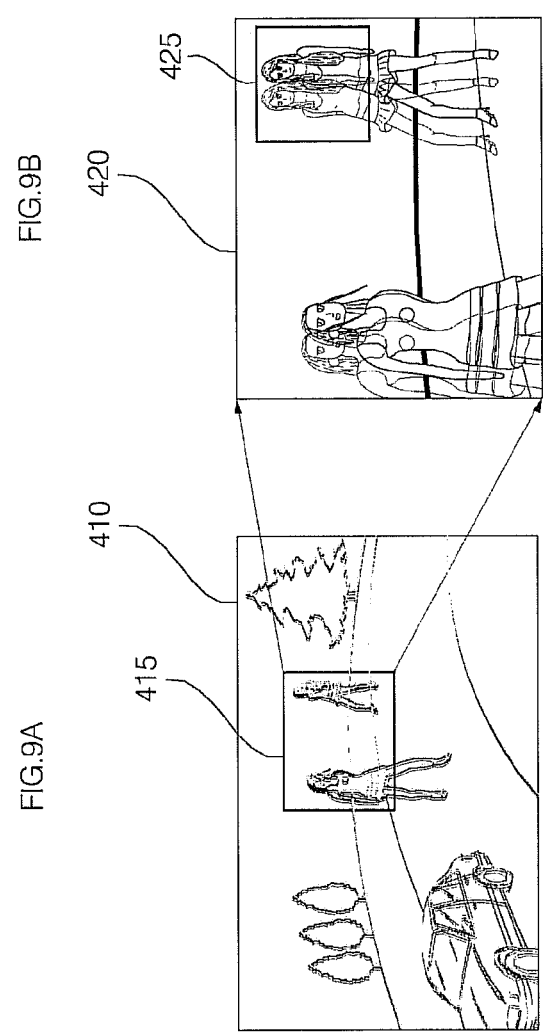

MOBILE TERMINAL AND OPERATION CONTROL METHOD THEREOF

CROSS-REFERENCE TO RELATED APPLICATION(S)

This application claims priority under 35 U.S.C. §119 to Korean Application No. 10-2010-0118918 filed in Korea on Nov. 26, 2010, whose entire disclosure(s) is/are hereby incorporated by reference.

BACKGROUND

1. Field

The present disclosure relates to a mobile terminal capable of correcting the disparity range of an object that falls outside a reference disparity range in response to a stereoscopic three-dimensional (3D) image including the object being enlarged or reduced, and an operation control method of the mobile terminal.

2. Background

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services, and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals has steadily grown due to a growing tendency of considering mobile terminals as personal items that can represent personal individuality.

In the meantime, stereoscopic three-dimensional (3D) imaging, which is a technique of combining multiple images captured by a camera to create a stereoscopic 3D image, have recently become commonplace. When applied to mobile terminals, stereoscopic 3D imaging can allow the users to create stereoscopic 3D images using the cameras of the mobile terminals and to display various stereoscopic 3D images on the displays of the mobile terminals. Stereoscopic 3D images can be displayed on the displays of mobile terminals using various methods such as auto-stereoscopy, which is also called glasses-free 3D.

Stereoscopic 3D images are generally created based on the disparity between left and right images thereof (e.g., a difference in relative positioning of the left and right images). Thus, if there are objects in stereoscopic 3D images that fall beyond a user's parallax limit, the objects may appear distorted and may thus cause fatigue, nausea, and/or headaches. This distortion becomes more severe when enlarging or reducing the stereoscopic 3D images.

Therefore, a method is needed to correct objects in a stereoscopic 3D image that fall outside a reference disparity range in response to the stereoscopic 3D image being enlarged or reduced.

BRIEF DESCRIPTION OF THE DRAWINGS

The embodiments will be described in detail with reference to the following drawings in which like reference numerals refer to like elements wherein:

FIGS. 6A and 6B are diagrams illustrating an example of how a 3D effect is distorted in response to a stereoscopic 3D image being enlarged;

FIG. 7 is a flowchart illustrating an operation control method of a mobile terminal, according to an exemplary embodiment of the present disclosure; and FIGS. 8 through 16 are diagrams illustrating the exemplary embodiment of FIG. 7.

DETAILED DESCRIPTION

The present disclosure will hereinafter be described in detail with reference to the accompanying drawings in which exemplary embodiments of the disclosure are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, or an electronic book (e-book) reader. In this disclosure, the terms 'module' and 'unit' can be used interchangeably.

Figure 1:
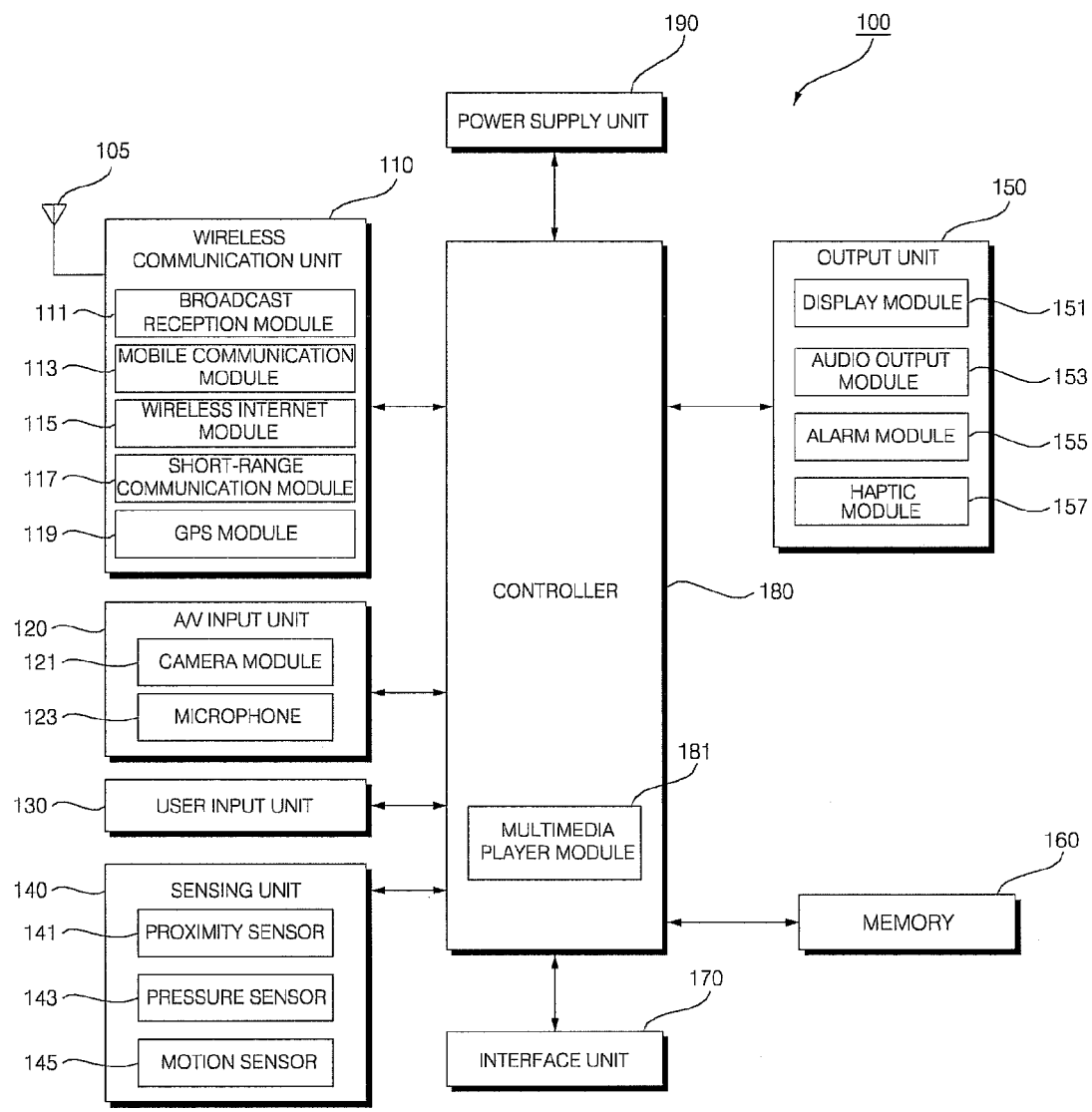
FIG. 1 is a block diagram of a mobile terminal according to an exemplary embodiment of the present disclosure.

FIG. 1 illustrates a block diagram of a mobile terminal 100 according to an embodiment of the present disclosure. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141. The detection sensor 141 may sense a position of a user relative to the mobile terminal 100. For example, a relative position of the user's eyes to a surface of a display of the mobile terminal 100 may be determined. In certain embodiments, the sensed distance of the user (e.g., user's eyes) may be used to calculate a maximum threshold value for disparity when displaying a stereoscopic 3D image, as discussed in further detail hereinafter.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present disclosure can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
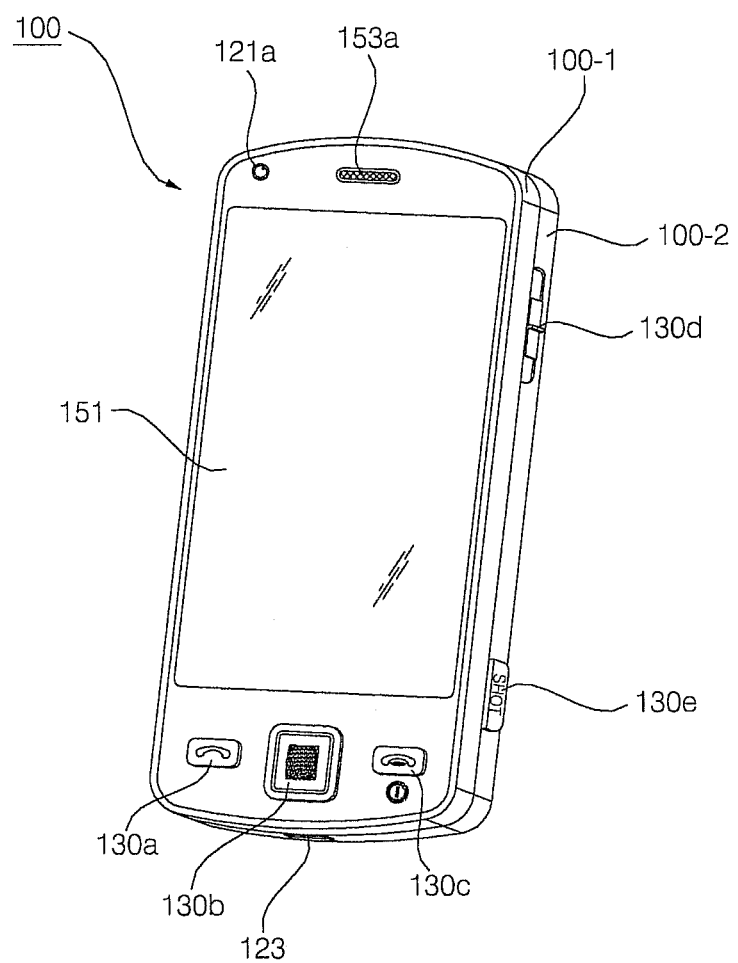
FIG. 2 is a front perspective view of the mobile terminal shown in FIG. 1.
Figure 3:
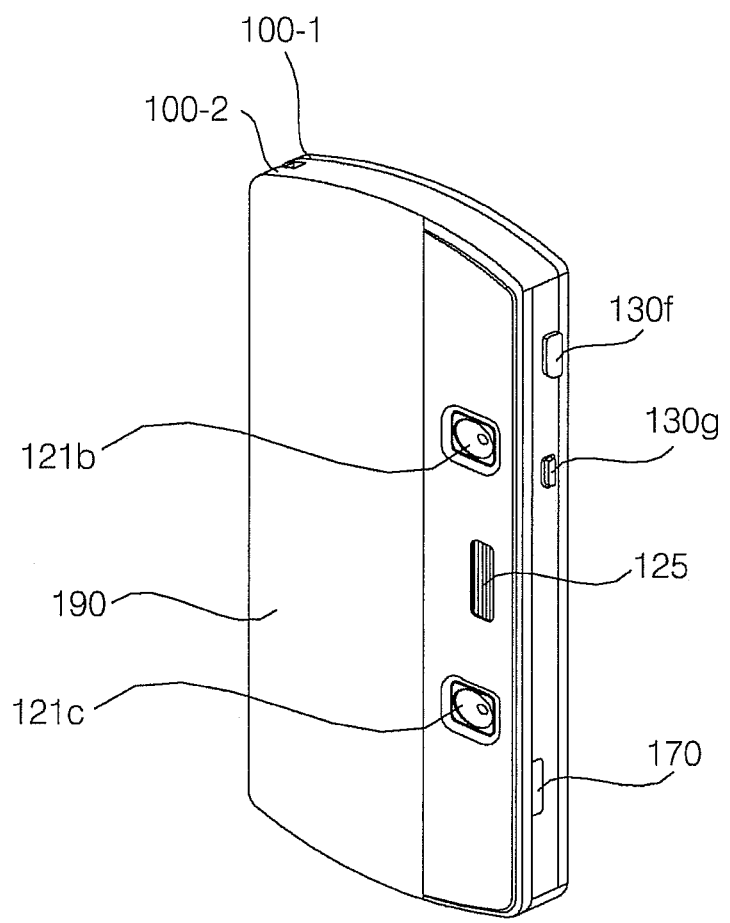
FIG. 3 is a rear perspective view of the mobile terminal shown in FIG. 2.

FIG. 2 illustrates a front perspective view of the mobile terminal 100, and FIG. 3 illustrates a rear perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153a, a camera 121a, and first through third user input modules 130a through 130c may be disposed in the main body of the mobile terminal 100, and particularly, on the front case 100-1. Fourth and fifth user input modules 130d and 130e and the microphone 123 may be disposed on one side of the rear case 100-2.

If a touch pad is configured to overlap the display module 151 and thus to form a mutual layer structure, the display module 151 may serve as a touch screen. Thus, the user can enter various information to the mobile terminal 100 simply by touching the display module 151.

The first audio output module 153a may be implemented as a receiver or a speaker. The camera 121a may be configured to be suitable for capturing a still or moving image of the user.

The microphone 123 may be configured to properly receive the user's voice or other sounds.

The first through fifth user input modules 130a through 130e and sixth and seventh user input modules 130f and 130g may be collectively referred to as the user input unit 130, and any means can be employed as the first through seventh user input modules 130a through 130f so long as it can operate in a tactile manner. For example, the user input unit 130 may be implemented as a dome switch or a touch pad that can receive a command or information according to a pressing or a touch operation by the user, or may be implemented as a wheel or jog type for rotating a key or as a joystick. In terms of function, the first through third user input modules 130a through 130c may operate as function keys for entering a command such as start, end, or scroll, the fourth user input module 130d may operate as a function key for selecting an operating mode for the mobile terminal 100, and the fifth user input module 130e may operate as a hot key for activating a special function within the mobile terminal 100.

Referring to FIG. 3, two cameras 121b and 121c may be additionally provided at the rear of the rear case 100-2, and the sixth and seventh user input modules 130f and 130g and the interface unit 170 may be disposed on one side of the rear case 100-2.

The cameras 121b and 121c may have an image capture direction which is substantially the opposite to that of the camera 121a, and may have a different resolution from that of the camera 121a. The cameras 121b and 121c may be used together to create a stereoscopic 3D image in a 3D capture mode or may be used separately to create a two-dimensional (2D) image. The distance between the cameras 121b and 121c may be configured to be adjustable. Thus, by adjusting the distance between the cameras 121b and 121c, it is possible to adjust the size or resolution of a stereoscopic 3D image. More specifically, one of the cameras 121b and 121c may be configured to be movable closer to or further away from the other camera so that the distance between the cameras 121b and 121c can be adjusted.

A flash 125 and a mirror may be disposed between the cameras 121b and 121c. When an image of a subject is captured by the cameras 121b and 121c, the flash 125 may illuminate the subject. The mirror may allow the user to see him or herself when he or she wants to capture his or her own image.

Another audio output module may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface unit 170 may used as a passage allowing the mobile terminal 100 to exchange data with an external device either through a fixed line or wirelessly.

A broadcast signal reception antenna may be disposed at one side of the front or rear case 100-1 or 100-2, in addition to an antenna used for call communication. The broadcast signal reception antenna may be installed such that it can be extended from the front or rear case 100-1 or 100-2.

The power supply unit 190 may be mounted on the rear case 100-2 and may supply power to the mobile terminal 100. The power supply unit 190 may be, for example, a chargeable battery which can be detachably combined to the rear case 100-2 for being charged.

The mobile terminal 100 may create a stereoscopic 3D image using the cameras 121b and 121c at the rear thereof, and may then display stereoscopic 3D image on the display module 151.

The mobile terminal 100 may display objects corresponding to stereoscopic 3D images differently from objects corresponding to 2D images so that the objects corresponding to stereoscopic 3D images can be easily distinguished from the objects corresponding to 2D images. The mobile terminal 100 may rearrange and display only the objects corresponding to stereoscopic 3D images on the display module 151.

Stereoscopic 3D images are images that can create the illusion of depth in an image and can thus provide viewers with a vivid sense of reality. The two eyes of a user may be approximately 65 mm apart from each other. Thus, when each of the two eyes are presented with different 2D images of the world, the 2D images are projected onto the retinas of the two eyes, and the brain extracts depth from the 2D retinal images using binocular disparity, which results from the horizontal separation of the two eyes and is one of the most important factors that should be considered when designing a 3D display device.

There are various methods of displaying a 3D image such as a stereoscopic display method, which is a method of displaying a 3D image with the use of glasses, an auto-stereoscopic display method, which is a method of displaying a 3D image without the use of glasses and is also called glasses-free 3D, and a projection method, which uses holography. The stereoscopic display method is generally used in home TV sets, and the auto-stereoscopic display method is generally used in mobile terminals.

Examples of the auto-stereoscopic display method include, but are not limited to, a lenticular display method, a parallax barrier method and a parallax illumination method. The lenticular display method involves using a sheet of hemispherical lenticular lenses to the front of a device that displays left-eye and right-eye images. The parallax barrier display method involves projecting left-eye and right-eye images through a parallax barrier. The parallax illumination method involves placing an illumination plate behind an LCD so as to make alternate columns of pixels visible to the left and right eyes. Various other types of stereoscopic 3D imaging techniques, other than those set forth herein, using several factors that can create the sense of three-dimensionality may be used.

Figure 4A:
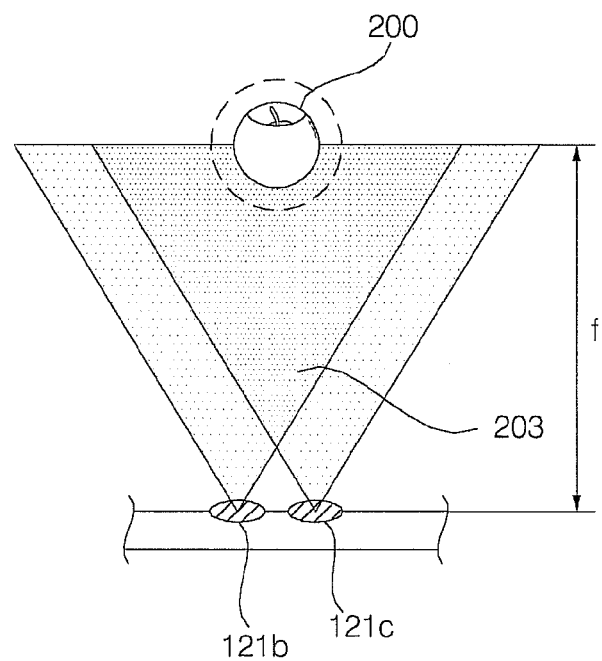
FIGS. 4A through 4C are diagrams illustrating an example of how to create a stereoscopic three-dimensional (3D) image.
Figure 4B:
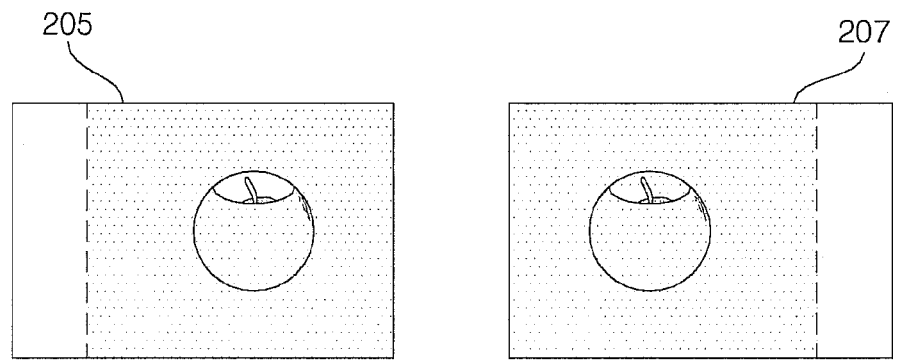
Figure 4C:
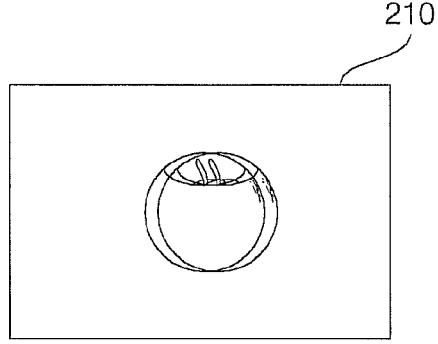

FIGS. 4A through 4C illustrate an example of how to create a stereoscopic 3D image. The mobile terminal 100 may create a stereoscopic 3D image using two cameras at the rear thereof, i.e., the cameras 121b and 121c. For convenience, the cameras 121b and 121c will hereinafter be referred to as the first and second cameras 121b and 121c, respectively.

Referring to FIGS. 4A and 4B, as a result of capturing a subject 200 using the first and second cameras 121b and 121c, first and second images 205 and 207 may be created.

The first and second images 205 and 207 provided by the first and second cameras 121b and 121c correspond to left-eye and right-eye images, respectively. Referring to FIG. 4C, the controller 180 may create a stereoscopic 3D image 210 using the disparity between the first and second images 205 and 207. For example, the disparity between the first and second images 205 and 207 may be a distance between corresponding points in the first and second images 205 and 207. The disparity in a stereoscopic 3D image and methods of correcting this value is described in further detail hereinafter.

As previously described, stereoscopic 3D images are images that can create the illusion of depth in an image and can thus provide viewers with a vivid sense of reality. The two eyes are about 65 mm apart from each other. Thus, when each of the two eyes is presented with different 2D images of the world, the 2D images are projected onto the retinas of the two eyes, and the brain extracts depth from the 2D retinal images using binocular disparity, which results from the horizontal separation of the two eyes and is one of the most important factors that should be considered when designing a 3D display device.

A stereoscopic 3D image 210 created by the controller 180 may be displayed on the display module 151 or may be printed using photographic paper and equipment. Not only stereoscopic 3D still images but also stereoscopic 3D moving images may be created using almost the same manner described above.

As noted, there are various methods of displaying a 3D image such as a stereoscopic display method, which is a method of displaying a 3D image with the use of glasses, an auto-stereoscopic display method, which is a method of displaying a 3D image without the use of glasses and is also called glasses-free 3D, and a projection method, which uses holography. The stereoscopic display method is generally used in home TV sets, and the auto-stereoscopic display method is generally used in mobile terminals.

Examples of the auto-stereoscopic display method include, but are not limited to a lenticular display method, a parallax barrier method and a parallax illumination method. The lenticular display method involves using a sheet of hemispherical lenticular lenses to the front of a device that displays left- and right-eye images. The parallax barrier display method involves projecting left- and right-eye images through a parallax barrier. The parallax illumination method involves placing an illumination plate behind an LCD so as to make alternate columns of pixels visible to the left and right eyes. Research is being conducted on various stereoscopic 3D imaging technique, other than those set forth herein, using several factors that can create the sense of three-dimensionality.

Various types of devices, other than a mobile terminal, may also be configured to be able to create and display stereoscopic 3D images.

Figure 5A:
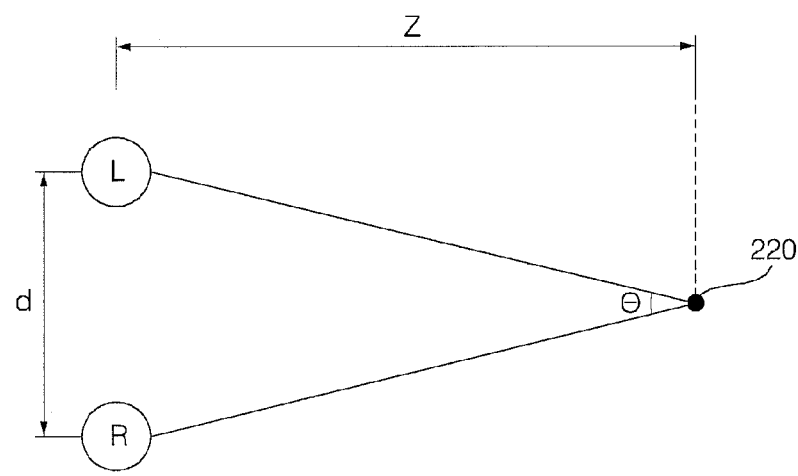
FIGS. 5A and 5B are diagrams illustrating an example of the relationship between the depth of a 3D object in a stereoscopic 3D image and fatigue.
Figure 5B:
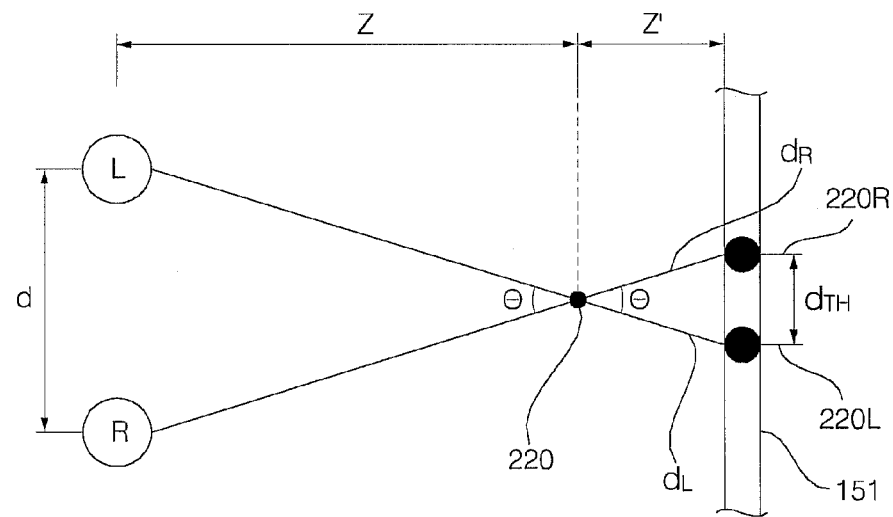

FIGS. 5A and 5B illustrate an example of the relationship between the depth of a 3D object in a stereoscopic 3D image and fatigue/discomfort. The depth of an object in a stereoscopic 3D image may vary according to the difference in the position of the object within the left-eye and right-eye images of the stereoscopic 3D image.

Referring to FIG. 5A, medical studies show that a viewer whose left-eye 223 and right-eye 225 are a distance d apart from each other may begin to feel fatigue when a convergence angle θ when viewing an object 220 exceeds about 1.5 degrees at a distance Z apart from the object 220. That is, the convergence angle θ becomes greater when focusing on a near object than when focusing on an object positioned farther away, and the greater the convergence angle, the more fatigue a viewer may experience. Thus, in order to reduce fatigue, a 3D object in a stereoscopic 3D image may be arranged such that the convergence angle θ can fall within a predefined range. The range of the convergence angle θ may be set to a default value in the mobile terminal or may be set based on user preferences.

Referring to FIG. 5B, the object 220 is perceived to protrude a distance Z' from a surface of the display 151. A threshold disparity $d_{TH}$ may be a distance between corresponding portions of a right-eye image 220R and a left-eye image 220L which are displayed on the display 151. The threshold disparity $d_{TH}$ may be the maximum disparity value within the reference disparity range for a given convergence angle θ. As shown, the threshold disparity $d_{TH}$ is related to distance Z' (perceived protruding distance of 3D object), the convergence angle θ as well as the total distance of the user to the display 151. The convergence angle θ may have a relationship to the perceived depth of the 3D object and the threshold binocular disparity $d_{TH}$ expressed by an equation $\cos(\theta) >= (d_L^2 + d_R^2 - d_{th}^2)/(2d_L d_R)$, where $\theta$ is the convergence angle, $d_L$ is a distance between a left-eye image and a point of convergence, $d_R$ is a distance between a right-eye image and a point of convergence, and $d_{TH}$ is the prescribed threshold of the binocular disparity.

The reference disparity range may be a predefined value stored in the mobile terminal. The disparity range may also be set by the user based on the user's preference or tolerance to changes in disparity. Alternatively, various models may be used to predict a user's discomfort level in order to set or adjust the reference disparity range.

Moreover, because the convergence angle $\theta$ depends on a user's position relative to the display screen 151, the reference disparity range may be based on a predefined distance Z for a user's position from the display: Alternatively, sensor 141 may measure the distance Z to determine the convergence angle $\theta$. The threshold disparity value may then be adjusted based on the detected position of the user.

FIG. 6 illustrates an example of how a 3D effect is distorted in response to a stereoscopic 3D image being enlarged. Referring to FIGS. 6A and 6B, a stereoscopic 3D image 230 may be created based on the disparity between left-eye and right-eye images 233 and 235. The disparity in the stereoscopic 3D image 230 may be d1, which may be a distance between objects at the centers of the left-eye and right-eye images 233 and 235 (hereinafter referred to as the central objects).

When a stereoscopic 3D image 230 is enlarged, a stereoscopic image 240 may be obtained by scaling the stereoscopic 3D image 230. The scaled stereoscopic 3D image 240 may be created based on enlarged left-eye and right-eye images 243 and 245 of the left-eye and right-eye images 233 and 235. Since the distance d2 between the centers of the enlarged left-eye and right-eye images 243 and 245 may be greater than d1, some objects in the stereoscopic 3D image 240 may fall outside a reference disparity range. This may cause the magnified stereoscopic 3D image 240 to appear distorted and cause fatigue. In this case, the disparity range of the objects that fall outside the reference disparity range may need to be corrected. Similarly, in response to the stereoscopic 3D image 230 being reduced in size, 3D objects in the resized stereoscopic 3D image may also appear to be distorted.

Simply for ease of explanation, the distance between common points in the image pairs have been described as being measured at the central objects. However, it should be appreciated that this disclosure is not limited to a particular central object, and the disparity in image pairs may be measured based on any corresponding reference points in the left-eye and right-eye images 233 and 235.

FIG. 7 illustrates a flowchart of an operation control method of a mobile terminal, according to an exemplary embodiment of the present disclosure. Referring to FIG. 7, in response to a 3D mode being selected or a user command being received, the controller 180 displays a stereoscopic 3D image, which is created based on the disparity between left-eye and right-eye images, on the display module 151 (S300).

In a case in which an input for changing the magnification of a stereoscopic 3D image, such as an input for enlarging or reducing a stereoscopic 3D image, is received (S305), the controller 180 changes the magnification of the left-eye and right-eye images, thereby generating magnification-changed (magnified or reduced) left-eye and right-eye images (S310).

The controller 180 moves objects within the magnification-changed left-eye and right-eye images such that the objects can fall within a reference disparity range (S315). For example, a central object in the magnification-changed left-eye and right-eye images may be selected, and other objects in the magnification-changed left-eye and right-eye images may be moved with respect to the selected central object. For example, the selected central objects may be moved to establish zero parallax, and other objects in the magnification-changed left-eye and right-eye images may be moved accordingly with respect to the selected central object. A zero parallax may be achieved when the images are moved such that they are superimposed on top of one another. In this case, the zero parallax plane may be the surface of the display screen and the distance between corresponding central objects of the first and second images may be zero such that the images are superimposed.

In a case in which it is difficult to move all objects that fall outside the reference disparity range together, as in the case when the magnification of a stereoscopic 3D image is changed not only for objects within a short range but also for objects in a remote range, all or some of the objects that fall outside the reference disparity range may be displayed two-dimensionally. The controller 180 may determine how many objects may be processed to correct their disparity based, for example, on predefined preferences to allocate system resources to this function.

The controller 180 interpolates a hole region that may be generated as a result of operation S315 using an appropriate interpolation method, thereby generating corrected left-eye and right-eye images (S320). For example, the hole region may be interpolated using the values of pixels adjacent to the hole region or an auxiliary image.

The controller 180 displays part of a corrected stereoscopic 3D image, which is designated by the input for changing the magnification of a stereoscopic 3D image, on the display module 151 (S325).

If a function other than changing the magnification of a stereoscopic 3D image is selected (S330), the controller 180 controls the selected function to be performed (S335). For example, in response to an input for moving a display screen being received, the controller 180 may move the corrected stereoscopic 3D image around on the display module 151. The controller 180 may also provide stereoscopic information corresponding to the corrected stereoscopic 3D image as numeric data, a graph, or an image.

Operations S305 through S335 are repeatedly performed until a user chooses to end the above-mentioned operation (S340).

According to this exemplary embodiment, it is possible to correct objects in a stereoscopic 3D image that fall outside a reference disparity range in response to the magnification of the stereoscopic 3D image being changed.

The exemplary embodiment of FIG. 7 will hereinafter be described in further detail with reference to FIGS. 8 through 16.

Figure 8:
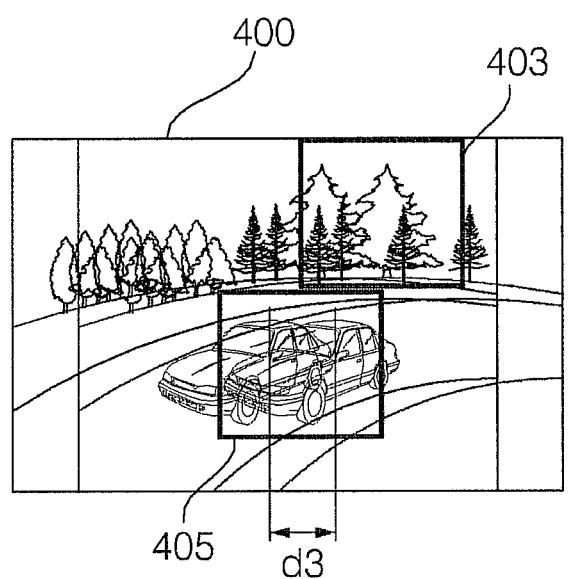

FIG. 8 illustrates an example of a stereoscopic 3D image. Referring to FIG. 8, in a case in which a portion 403 of a stereoscopic 3D image 400 including a remote object and a portion 405 of the stereoscopic 3D image 400 including a near object are enlarged, different objects may be selected from the stereoscopic 3D image portions 403 and 405 as central objects, and other objects in the stereoscopic 3D image 400 may be corrected using the selected central objects.

For example, the image pair of the object in the near portion 405 may be selected as the central objects. The central objects in the near portion 405 may be moved by a distance d3 to establish a zero parallax. The other objects in the stereoscopic 3D image 400, including the remote portion 403 as well as other regions of the image 400, may be moved by as much as the central objects, thereby correcting the stereoscopic 3D image 400.

Referring to FIGS. 9A and 9B, a portion 415 of a stereoscopic 3D image 410 may be selectively enlarged, thereby obtaining an enlarged stereoscopic 3D image 420. The higher the magnification of the stereoscopic 3D image 410, the greater the 3D effect of the stereoscopic 3D image 410 becomes. If none of the objects in the stereoscopic 3D image 420 fall outside a reference disparity range, the stereoscopic 3D image 420 does not need to be corrected.

Referring to FIG. 9B, a portion 425 of the stereoscopic 3D image 420 is enlarged, thereby obtaining an enlarged stereoscopic 3D image 430, as shown in FIG. 9C. A disparity d5 of the enlarged stereoscopic 3D image 430 becomes greater than that of the stereoscopic 3D image 420. If the disparity d5 falls outside a reference disparity range, the stereoscopic 3D image 430 may cause eye fatigue and pain, and thus needs to be corrected. For example, the disparity d5 may be reduced to be within the reference disparity range. Alternatively, the disparity of the magnified image may be adjusted to a disparity prior to the magnification. For example, the disparity d5 of image 430 may be changed to the disparity in image 425 which existed prior to the magnification of the image.

Moreover, if the stereoscopic 3D image 420 is too large to be corrected, the whole stereoscopic 3D image 420 or at least part of the stereoscopic 3D image 420 may be displayed two-dimensionally. Whether the image is displayed in two-dimensions may be determined based on a predefined amount of resources which is dedicated to this function and the amount of time needed to process the changes.

Figure 10:
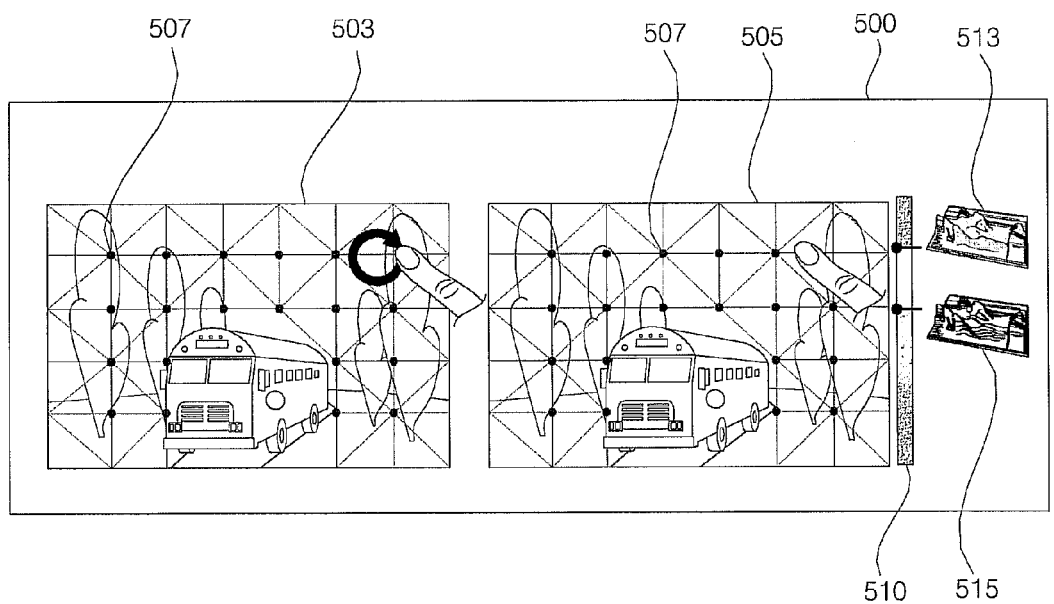

FIG. 10 illustrates an example of how to adjust disparity through image division and warping. Referring to FIG. 10, left-eye and right-eye images 503 and 505 are displayed together on a display screen 500 for adjusting disparity or depth. If a user selects parts of the left-eye and right-eye images 503 and 505, a mesh is displayed over the selected parts of the left-eye and right-eye images 503 and 505 so that each of the left-eye and right-eye images 503 and 505 can be divided into a plurality of sections. Intersections in the mesh are marked.

Pointers 507 in the mesh are points with values higher than a predefined threshold selected from edge portions in each of the left-eye and right-eye images 503 and 505, and may form one or more planes by being connected to one another. If the user touches and then rotates the pointers clockwise, the depth of the pointers may increase when a stereoscopic 3D image is created based on the left-eye and right-eye images 503 and 505.

The depth of a stereoscopic 3D image may be represented using a color bar 510, which may be provided on the right side of the right-eye image 505. The color bar 510 represents relative depth to a default depth value obtained by auto-convergence. If the user touches and then rotates the pointers counterclockwise, a stereoscopic 3D image may be displayed in a relative depth to a depth value obtained by auto-convergence. In order to provide both depth values obtained by auto-convergence and depth information of a whole image, a whole depth map obtained by auto-convergence may be displayed as a 3D histogram 513, and a depth map obtained by changing the depth of the left-eye and right-eye images 503 and 505 may be displayed below the 3D histogram 513 as a 3D histogram 515. If the depth of one of the left-eye and right-eye images 503 and 505 is modified through image division and warping, the depth of the other eye image may be automatically modified accordingly.

If the depth of the left-eye and right-eye images 503 and 505 can be modified freely for all the sections, a stereoscopic 3D image may become unnatural, and thus, a limit may be imposed on modifying the depth of each of the left-eye and right-eye images 503 and 505. That is, the depth of the left-eye and right-eye images 503 and 505 is not modified to the extent that, in a case in which there are two objects overlapping each other, the object at the rear can appear to be more protruding than the object at the front or vice versa. For this, the color bar 510 may provide allowable depth variation range information for each object based on the depths of neighboring objects so that the user cannot modify the depth of each object beyond a corresponding allowable depth variation range. The depth of an image can be effectively modified through image division and warping while preventing the 3D effect of the image from being distorted.

Figure 11A:
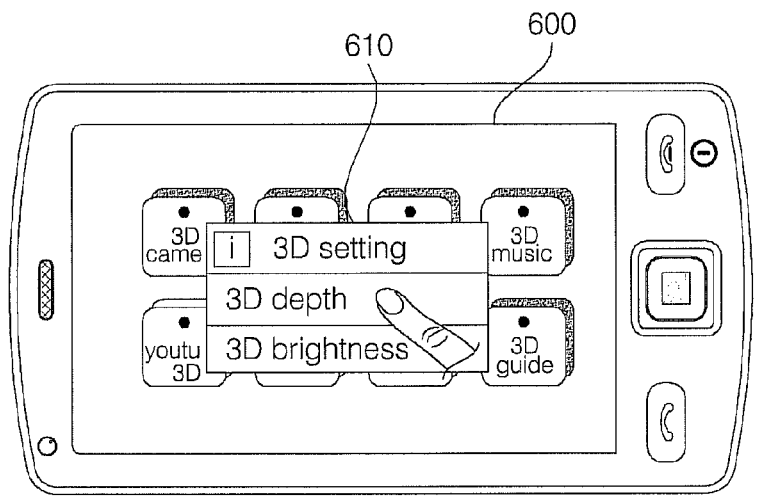
Figure 11B:
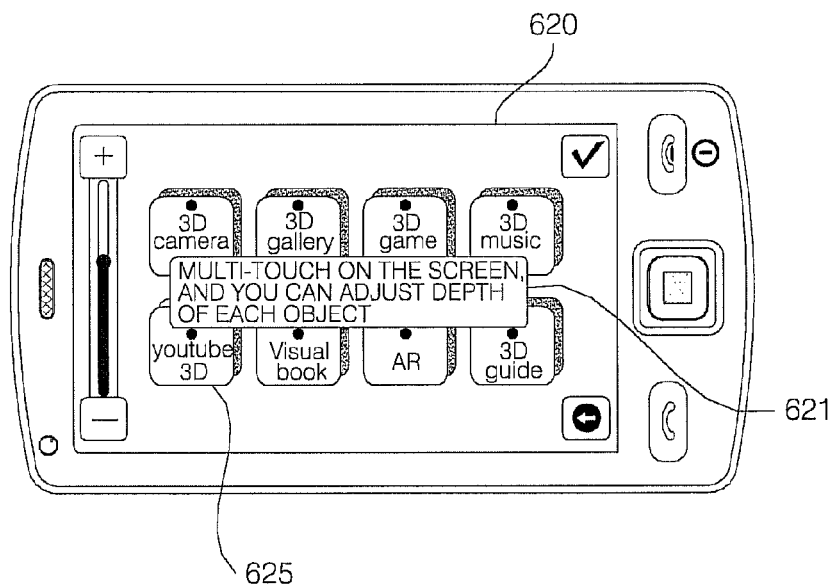

FIGS. 11A and 11B illustrates an example of how to adjust the depth and disparity of a stereoscopic 3D image. Referring to FIG. 11A, a 3D depth setting menu 610 may be provided on a 3D mode screen 600, on which a stereoscopic 3D image is displayed.

In a case in which an item '3D depth' is selected from the 3D depth setting menu 610, a display screen 620 for adjusting the disparity or depth of a whole stereoscopic 3D image or part of a stereoscopic 3D image may be displayed, as shown in FIG. 11B. A message window 621 may be displayed to provide notifications to the user, as shown. In this case, a perceived depth of the 3D objects 625 (e.g., icons) may be adjusted on the display screen 620.

Figure 12A:
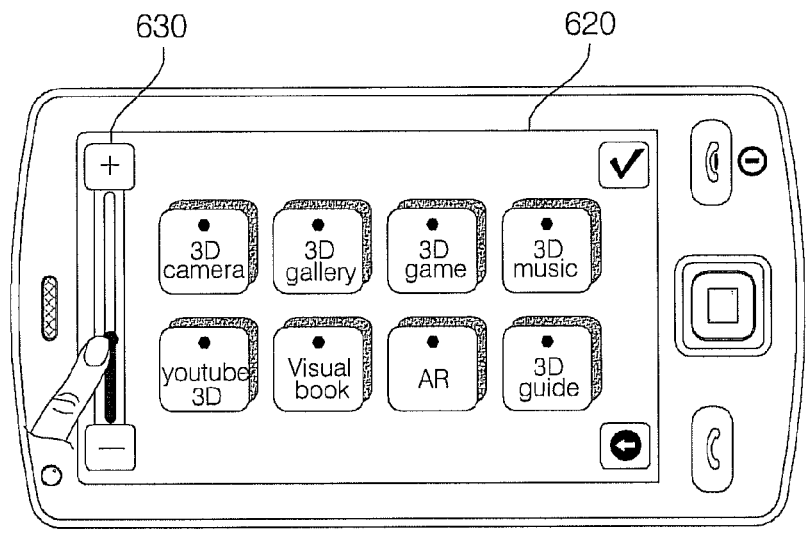
Figure 12B:
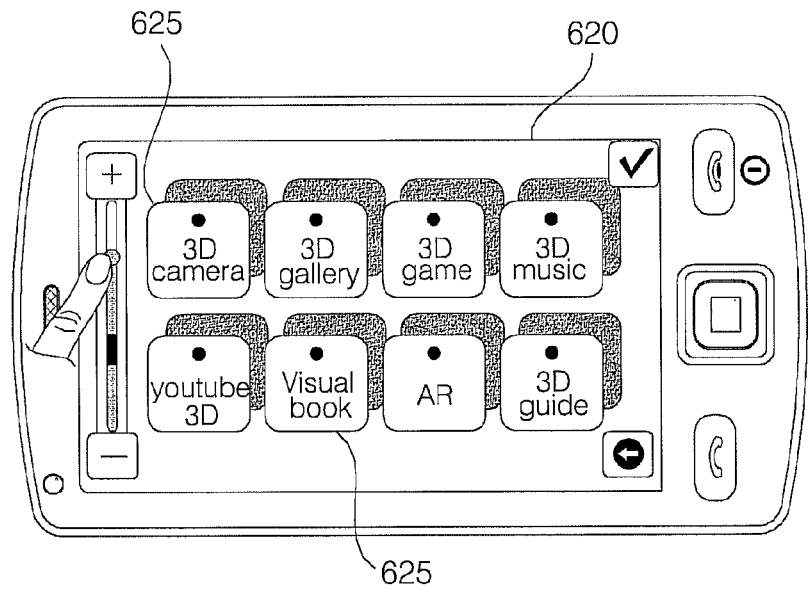

FIGS. 12A and 12B illustrates an example of how to adjust the depth of a whole stereoscopic 3D image using a scrollbar. Referring to FIGS. 12A and 12B, a stereoscopic 3D image that includes, for example, a plurality of 3D icons 625 may be displayed on a display screen 620. The depth of the stereoscopic 3D image on the display screen 620 may be configured to increase in response to the slider in a scrollbar 630, which is provided on the left side of the display screen 620, being scrolled up, and to decrease in response to the slider in the scrollbar 630 being scrolled down.

In response to the slider in the scrollbar 630 being scrolled up or down, objects 625 in the stereoscopic 3D image on the display screen 620 may be configured to be enlarged or reduced according to a variation in the depth of the corresponding stereoscopic 3D image.

Figure 13A:
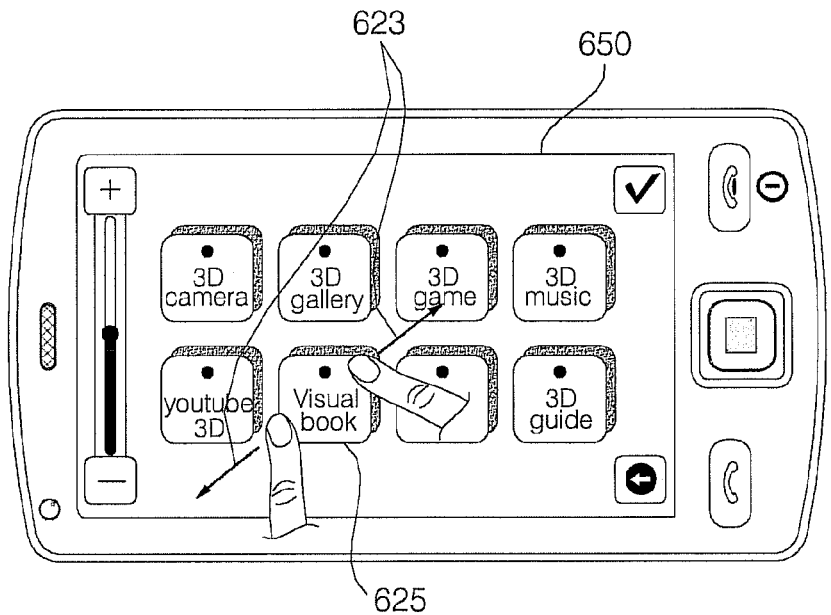
Figure 13B:
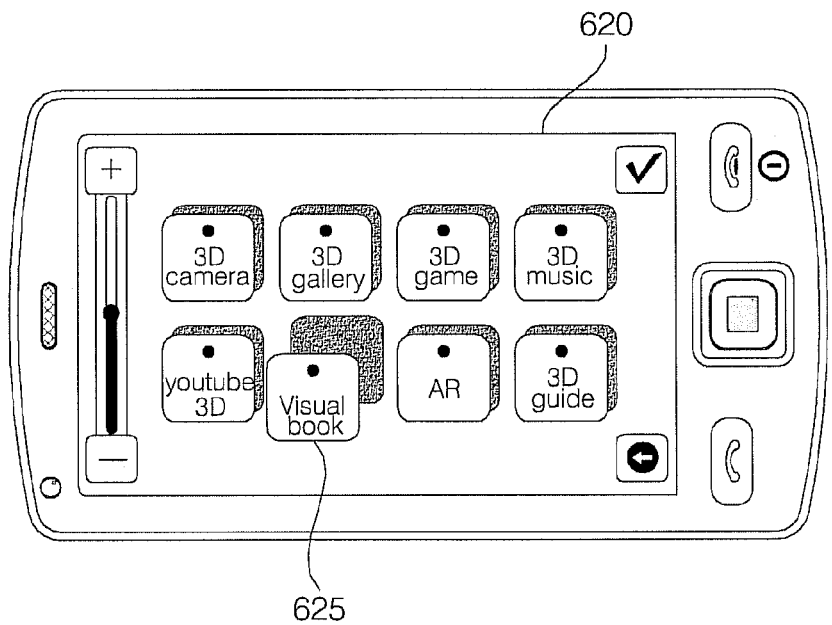

Referring to FIGS. 13A and 13B, in response to a pinch-out input 623, which is generated by multi-touching on a particular object with two or more fingers and dragging the fingers apart from each other, being received, the depth of a particular object may be configured to be adjusted, for example, to increase. In this example, the depth of an object 625 can be selectively adjusted in response to a pinch-out input to be perceived to protrude further from the display, as shown.

Figure 14A:
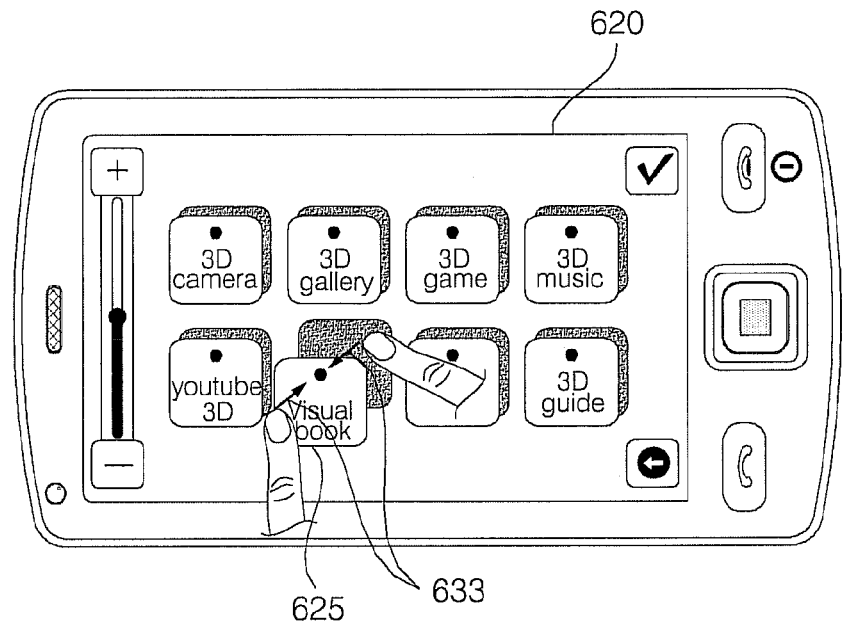
Figure 14B:
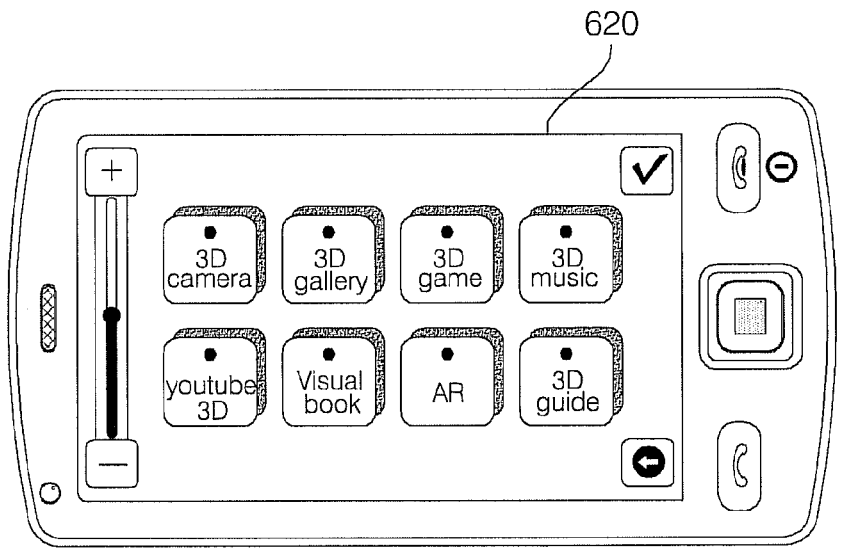

Referring to FIGS. 14A and 14B, in response to a pinch-in input 633, which is generated by multi-touching on a particular object with two or more fingers and dragging the fingers closer to each other, being received, the depth of the particular object may be configured to decrease.

Alternatively, the depth of an object may be configured to be adjusted in response to a long-touch input.

Figure 15:
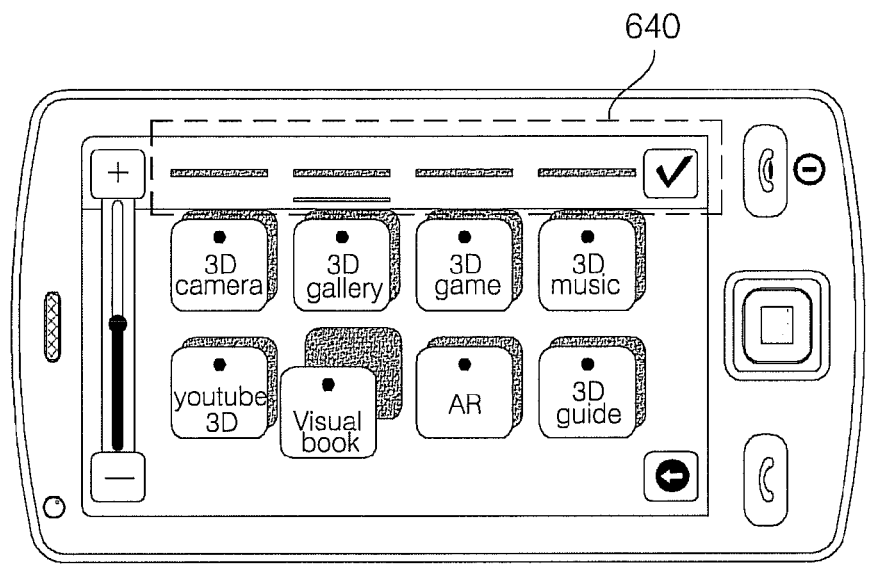

Referring to FIG. 15, a 3D map 640 may be displayed at a display screen. The 3D map 640 shows the depths of objects currently being displayed on the display screen. On the 3D map 640, an object currently being manipulated by a user may be displayed in a different color from other objects.

Figure 16:
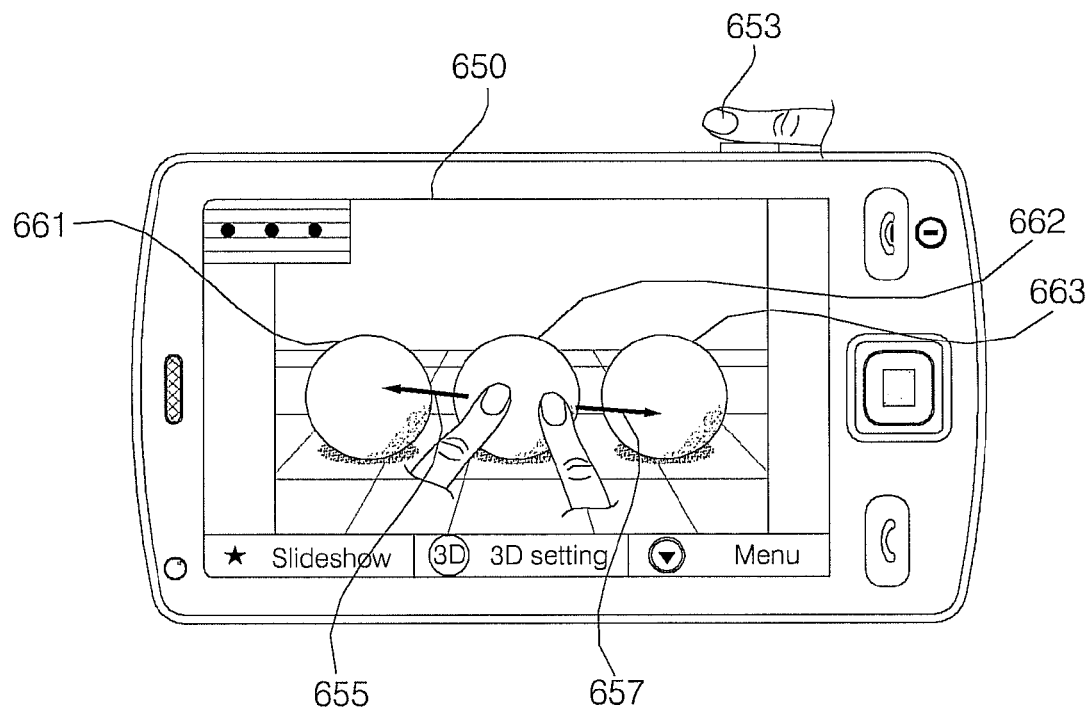

Referring to FIG. 16, a stereoscopic 3D image 650 may include a plurality of 3D objects 661, 662, 663. In a case in which a particular object 662 is multi-touched with two fingers and then the two fingers are dragged apart from or closer to each other, as indicated by reference numerals 655 and 657, while pressing on a prescribed key with another finger, as indicated by reference numeral 653, the depth of the object 662 may be configured to be adjusted. In this case, the depth of the object 662 may be configured to increase in response to a pinch-out input and to decrease in response to a pinch-in input. Alternatively, the pinch input together with a selection of the button 653 may change a perceived 3D depth of the entire stereoscopic 3D image 650 rather than only the object 662 as disclosed above. Moreover, as described above, it is possible to adjust the depth or disparity of an object using various gesture inputs.

The mobile terminal according to the present disclosure and the operation control method thereof, according to the present disclosure are not restricted to the exemplary embodiments set forth herein. Therefore, variations and combinations of the exemplary embodiments set forth herein may fall within the scope of the present disclosure.

The present disclosure can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present disclosure can be easily construed by one of ordinary skill in the art.

As described above, according to the present disclosure, it is possible to properly correct the disparity of objects in a stereoscopic 3D image that fall outside a reference disparity range in response to the stereoscopic 3D image being enlarged or reduced. Thus, it is possible to prevent nausea or headaches that may arise when objects in a stereoscopic 3D image fall outside a reference disparity range in response to the stereoscopic 3D image being enlarged or reduced.

As embodied and broadly disclosed herein, the present disclosure provides a mobile terminal capable of correcting the disparity range of an object that falls outside a reference disparity range in response to a stereoscopic three-dimensional (3D) image including the object being enlarged or reduced, and an operation control method of the mobile terminal.

According to an aspect of the present disclosure, there is provided an operation control method of a mobile terminal, the operation control method including displaying a first stereoscopic 3D image, which is created based on a disparity between first and second images, on a display module; in response to an input for changing the magnification of an image being received, changing a magnification of the first and second images; generating first and second corrected images by moving, with respect to a central object selected from the magnification-changed first and second images, other objects in the magnification-changed first and second images that fall outside a reference disparity range so that the moved objects can fall back in the reference disparity range; and displaying a portion of a second stereoscopic 3D image designated by the magnification change input on the display module, the second stereoscopic 3D image being created based on a disparity between the magnification-changed first and second images.

According to another aspect of the present disclosure, there is provided a mobile terminal including a display module configured to display thereon a first stereoscopic 3D image, which is created based on a disparity between first and second images; and a controller configured to, in response to an input for changing the magnification of an image being received, change a magnification of the first and second images and generate first and second corrected images by moving, with respect to a central object selected from the magnification-changed first and second images, other objects in the magnification-changed first and second images that fall outside a reference disparity range so that the moved objects can fall back in the reference disparity range, the controller being configured to display on the display module a portion of a second stereoscopic 3D image designated by the magnification change input on the display module, the second stereoscopic 3D image being created based on a disparity between the magnification-changed first and second images.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a 3D display configured to display a 3D image that includes first and second images, the 3D image including a plurality of 3D objects; and
a controller configured to change a magnification of the 3D image that includes the first and second images in response to a user input and to correct a binocular disparity between a first scaled image and a second scaled image,
wherein the controller determines a binocular disparity between the first and second scaled images, determines whether the binocular disparity is outside a prescribed range of disparity, repositions at least one of the first or second scaled images such that the binocular disparity is within the prescribed range of disparity, and controls the 3D display to display the corrected first and second scaled images,
wherein the controller repositions the at least one of the first or second scaled images by repositioning at least one 3D object that falls outside the prescribed range of disparity on the basis of a central object selected from the first and second scaled images, and
wherein the controller controls the 3D display to display some of the 3D objects that fall outside the prescribed range of disparity as a two-dimensional (2D) object if it is difficult to reposition all 3D objects that fall outside the prescribed range of disparity together.

2. The mobile terminal of claim 1, wherein
binocular disparity between the first and second scaled images is determined based on the central object of the plurality of 3D objects.

3. The mobile terminal of claim 2, wherein the controller corrects the binocular disparity between the first scaled image and the second scaled image by moving the central object of the plurality of 3D objects of the first and second scaled images to establish a zero parallax.

4. The mobile terminal of claim 1, wherein the controller moves the first and second scaled images on the 3D display in response to a request to move the scaled 3D image.

5. The mobile terminal of claim 1, wherein, when the magnification of the first and second images exceeds a reference level, the controller controls the 3D display to display a 2D image corresponding to the scaled first and second images.

6. The mobile terminal of claim 1, wherein the controller interpolates to fill a hole region created by repositioning the first or second scaled images.

7. The mobile terminal of claim 6, wherein the controller interpolates pixels adjacent to the hole region to fill the hole region.

8. The mobile terminal of claim 1, wherein the controller corrects a binocular disparity of 3D object selected from the plurality of 3D objects in response to a predefined gesture input that includes a pinch-in input or a pinch-out input.

9. The mobile terminal of claim 1, wherein the controller adjusts a perceived depth of the 3D image through image division and warping.

10. The mobile terminal of claim 1, wherein, in response to a predefined input, the controller controls the 3D display to display one or more objects selected from the first and second scaled images as 3D objects and to display other non-selected objects in the first and second scaled images as 2D objects.

11. The mobile terminal of claim 1, wherein the controller controls the 3D display to display stereoscopic information corresponding to the displayed first and second scaled images.

12. The mobile terminal of claim 11, wherein the stereoscopic information is displayed as at least one of numeric data, a graph, or an image.

13. A method for controlling a 3D display on a mobile terminal comprising:
displaying, by the 3D display of the mobile terminal, a 3D image that includes a first and second images, the 3D image including a plurality of 3D objects;
changing, by a controller of the mobile terminal, a magnification of the object that includes the first and second images in response to a user input; and
correcting, by the controller, a binocular disparity between the first and second scaled images,
wherein the correcting the binocular disparity comprises:
determining, by the controller, a binocular disparity between a first scaled image and a second scaled image;
determining, by the controller, whether the binocular disparity is outside a prescribed range of disparity;
repositioning, by the controller, at least one of the first or second scaled images such that the binocular disparity is within the prescribed range of disparity; and
controlling, by the controller, the 3D display to display the corrected first and second scaled images,
wherein the repositioning the at least one of the first or second scaled images comprise repositioning the at least one of the first or second scaled images by repositioning at least one 3D object that falls outside the prescribed range of disparity on the basis of a central object selected from the first and second scaled images, and
wherein the correcting the binocular disparity further comprises: controlling, by the controller, the 3D display to display some of the plurality of 3D objects that fall outside the prescribed range of disparity as a two-dimensional (2D) object when it is difficult to reposition all 3D objects that fall outside the prescribed range of disparity together.

14. The method of claim 13, wherein the binocular disparity between the first and second scaled images is determined based on the central object of the plurality of 3D objects.

15. The method of claim 13, wherein the correcting the binocular disparity further comprises: moving, by the controller, the central object of the plurality of 3D objects of the first and second scaled images to establish a zero parallax.

16. The method of claim 13, wherein correcting the binocular disparity further comprises: controlling, by the controller, the 3D display to display a 2D image corresponding to the scaled first and second images when the magnification of the first and second images exceeds a reference level.

17. A mobile terminal comprising:
a 3D display for displaying first and second images to generate a 3D image having a plurality of 3D objects; and
a controller configured to adjust a display of the first and second images, wherein
the controller scales the first and second images in response to a user input,
determines whether a binocular disparity of the plurality of 3D objects in the scaled first and second images are within a prescribed threshold,
repositions at least one of the plurality of 3D objects in the first and second images such that the binocular disparity is within the prescribed threshold, and
displays the adjusted first and second images, and
wherein the controller repositions at least one 3D object that falls outside the prescribed range of disparity on the basis of a central object selected from the first and second scaled images, and
wherein the controller controls the 3D display to display some of the 3D objects that fall outside the prescribed threshold as a two-dimensional (2D) object if it is difficult to reposition all 3D objects that fall outside the prescribed threshold together.

18. A method for controlling a 3D display on a mobile terminal comprising:
displaying, by the 3D display of the mobile terminal, first and second images to generate a 3D image having a plurality of 3D objects; and
adjusting, by a controller of the mobile terminal, a display of the first and second images,
wherein the adjusting the display comprises:
scaling, by the controller, the first and second images in response to a user input;
determining, by the controller, whether a binocular disparity of the plurality of 3D objects in the scaled first and second images are outside a prescribed threshold;
repositioning, by the controller, at least one of the plurality of 3D objects in the first and second images such that the binocular disparity is within the prescribed threshold; and
controlling, by the controller, the 3D display to display the adjusted first and second images,
wherein the repositioning at least one of the plurality of 3D objects comprises repositioning at least one 3D object that falls outside the prescribed threshold on the basis of a central object selected from the first and second scaled images, and wherein the adjusting the display further comprises: controlling, by the controller, the 3D display to display some of the plurality of 3D objects that fall outside the prescribed threshold as a two-dimensional (2D) object when it is difficult to reposition all 3D objects that fall outside the prescribed threshold together.

* * * * *